Oct. 20, 1925.
R. O. MOREIDA
1,557,861
MILK CAN HOLDER AND MILK DISPENSER
Filed Feb. 8, 1923
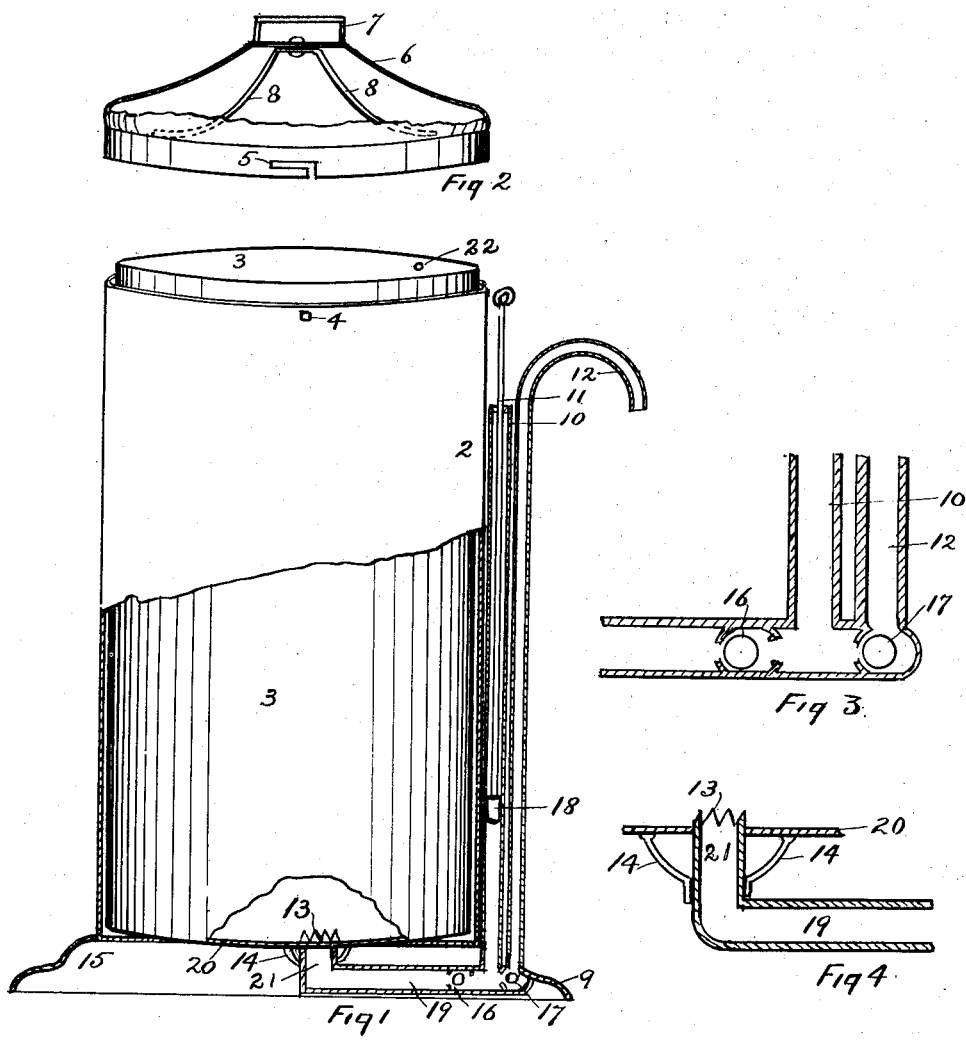
INVENTOR
ROBERT O. MOREIDA,
BY
Francis C. Huebner,
ATTORNEY Patented Oct. 20, 1925.

1,557,861

UNITED STATES PATENT OFFICE.

ROBERT O. MOREIDA, OF FRESNO, CALIFORNIA.

MILK-CAN HOLDER AND MILK DISPENSER.

Application filed February 8, 1923. Serial No. 617,753.

*To all whom it may concern:*

Be it known that I, ROBERT O. MOREIDA, a citizen of the United States, and resident of Fresno, in the county of Fresno and the State of California, have invented a new and useful Improvement in Milk-Can Holders and Milk Dispensers, of which the following is a specification.

My invention relates to a milk can holder and milk dispenser, and more specifically to a device for holding cans of condensed milk and dispensing the milk therefrom.

The object attained is a combined milk can holder and milk dispenser whereby the can of condensed milk or cream can be placed within the holder, and by manipulating a plunger the milk can be ejected through a spout for use. It is noted that by this combination of container and milk-can, that the milk can be retained in the can until used, and the openings into the can are kept under cover and free from dust and dirt. The attachment of the pump to the milk-can is easily accomplished and air tight.

I accomplish these and other objects herein disclosed by means of the device hereinafter described and illustrated on the accompanying drawing in which drawing Figure 1 shows a sectional view of the device, showing a milk-can therein. Figure 2 is a cover for the container, partly in section. Figure 3 is a sectional view of a valve. Figure 4 is an enlarged view of the means for attaching the pump to the milk-can In said drawing, 2 is a container adapted to receive a can of milk 3. The container is provided with one or more lugs 4 on the outside surface, a spaced distance from the top, which lugs are adapted to enter an L shaped slot 5 in the lower part of the lid or cover 6. The object of this lug and slot is to fasten the lid to the container. The cover is provided on the outside with a handle 7. In the under part of the lid I have attached one or more leaf springs 8 which function to hold the can 3 adjacent to the bottom of the container. The base of the container is designated as 9.

I have constructed a pump, having a cylinder 10, a piston rod 11, a piston 18 and an outlet pipe or spout 12 extending from the bottom of the pump. I have provided an opening into the milk can consisting of a pipe 21 which extends upward through the bottom of the container, said pipe terminating at the top with a plurality of sharpened projections 13. These projections are adapted to pierce the bottom 20 of the milk-can when the can is forced downward, so that the opening thus made in the bottom of the can will register with the opening in the end of pipe 21 within the container. Pipe 21 is connected with a lead 19 in which are two ordinary ball valves, 16 and 17, one being located on either side of the opening connecting the cylinder 10 with pipe 19, the valve 17 being between openings to cylinder 10 and outlet spout 12. A hole 22 should be punched in the top of the milk-can to give normal air pressure.

To make the connection between pipe 21 and the bottom of the can 3 airtight, I use a suction cup or cap 14 which fit tightly around pipe 21, and the edges of the cup adhere to the bottom of the can by suction pressure.

It will be noted that when the milk-can is adjusted in the container, by the movement of piston 11, co-operating with valves 16 and 17 the milk can be pumped from the can.

Having described my invention I claim as new and patentable:

The combination with a milk-can of a container adapted to hold said can, a piston pump adapted to discharge fluid through a spout, attached to the container and having the intake opening of the pump positioned within the container and adjacent to the bottom thereof, and means for connecting the pump to the milk can consisting of a plurality of sharp projections surrounding the intake opening adapted to pierce the bottom of the can, and a suction cup fitted around the intake opening under the projections and adapted to engage the bottom of the can into which the projections have been forced.

ROBERT O. MOREIDA.